US008150576B2

(12) United States Patent
Ptak et al.

(10) Patent No.: US 8,150,576 B2
(45) Date of Patent: Apr. 3, 2012

(54) ENGINE GLOW PLUG DIAGNOSIS USING CRANKSHAFT SENSOR DATA

(75) Inventors: Richard Ptak, Woodstock, IL (US); Ly V. Tran, Carol Stream, IL (US); David M. Hsia, Bartlett, IL (US)

(73) Assignee: International Engine Intellectual Property Company LLC, Lisle, IL (US)

( * ) Notice: Subject to any disclaimer, the term of this patent is extended or adjusted under 35 U.S.C. 154(b) by 1243 days.

(21) Appl. No.: 11/767,696

(22) Filed: Jun. 25, 2007

(65) Prior Publication Data

US 2008/0319599 A1 Dec. 25, 2008

(51) Int. Cl.
*G01M 17/00* (2006.01)

(52) U.S. Cl. ....... 701/31.8; 701/99; 701/29.1; 701/34.4; 123/145 A; 123/179.21

(58) Field of Classification Search ............... 123/179.8, 123/556, 502, 500, 179.1–179.21; 60/299; 422/177; 701/1, 93, 29, 31, 35, 36, 99, 111–114, 701/29.1, 29.2, 29.7, 30.4, 31.7, 32.1, 33.5, 701/33.6, 34.4; 340/438, 439, 441, 459, 340/500, 501

See application file for complete search history.

(56) References Cited

U.S. PATENT DOCUMENTS 4,227,402 A * 10/1980 Dooley et al. .............. 73/114.18
4,359,643 A * 11/1982 Tada et al. .................... 290/38 R
4,518,268 A * 5/1985 Swis et al. ..................... 374/144
4,809,177 A 2/1989 Windle
4,926,331 A 5/1990 Windle
5,006,781 A * 4/1991 Schultz et al. .................. 322/25
5,017,916 A 5/1991 Londt
5,018,087 A 5/1991 Dannenberg
5,158,050 A * 10/1992 Hawkins et al. .......... 123/145 A
5,241,929 A * 9/1993 Grassi et al. .............. 123/145 A
5,261,366 A * 11/1993 Regueiro ...................... 123/299
5,365,436 A 11/1994 Schaller
5,367,996 A * 11/1994 Homik et al. .............. 123/179.8
5,617,831 A * 4/1997 Shirakawa .................... 123/502
5,634,443 A * 6/1997 Mathews ................. 123/179.21
5,749,346 A * 5/1998 Halvorson et al. ............ 123/486
5,847,644 A * 12/1998 Weisman et al. ............. 340/439
6,009,369 A * 12/1999 Boisvert et al. ................. 701/99
6,016,459 A 1/2000 Isaac
6,067,489 A * 5/2000 Letang et al. ................... 701/36
6,112,138 A 8/2000 Dannenberg
6,148,258 A * 11/2000 Boisvert et al. ................. 701/99
6,188,948 B1 2/2001 Shivler, Jr.
6,263,269 B1 7/2001 Dannenberg
6,272,402 B1 8/2001 Kelwaski
6,273,056 B1 * 8/2001 Shirakawa et al. ........... 123/305
6,313,742 B1 11/2001 Larson
6,354,256 B1 * 3/2002 Ohanian et al. .......... 123/179.21
6,356,822 B1 3/2002 Diaz (Continued)

*Primary Examiner* — John Nguyen
*Assistant Examiner* — Michael Ng
(74) *Attorney, Agent, or Firm* — Mark C. Bach; Jeffrey P. Calfa

(57) ABSTRACT

A motor vehicle engine (10) has glow plugs (20) for aiding combustion of fuel in combustion chambers of the engine when the engine is cold and an ignition switch (24) is operated to crank the engine. An aberration in engine speed (36) is used to indicate an under- or non-performing glow plug. Data from sources other than the engine speed source (28), such as data related to engine fueling, is also processed by a processor (30) to exclude them as the cause of the aberration.

8 Claims, 1 Drawing Sheet

U.S. PATENT DOCUMENTS

| | | | |
|---|---|---|---|
| 6,401,700 | B2 | 6/2002 | Balekai |
| 6,430,485 | B1 | 8/2002 | Hullinger |
| 6,431,304 | B1 | 8/2002 | Smythe |
| 6,584,391 | B2 | 6/2003 | Lack |
| 6,618,665 | B2 | 9/2003 | Walker |
| 6,654,678 | B1 | 11/2003 | Rodriguez |
| 6,698,409 | B1 | 3/2004 | Kennedy |
| 6,724,102 | B1 | 4/2004 | Kelwaski |
| 6,725,147 | B2 | 4/2004 | Mollin |
| 6,738,701 | B2 | 5/2004 | Wilson |
| 6,801,846 | B1 | 10/2004 | Rodriguez |
| 6,842,676 | B2 | 1/2005 | Rodriguez |
| 6,850,832 | B1 | 2/2005 | Rodriguez |
| 6,907,445 | B2 | 6/2005 | Pellegrino |
| 6,934,619 | B2 | 8/2005 | Read |
| 6,947,822 | B2 | 9/2005 | Martinez, Jr. |
| 6,947,832 | B2 | 9/2005 | Rodriguez |
| 6,973,382 | B2 | 12/2005 | Rodriguez |
| 6,985,808 | B1 | 1/2006 | Kennedy |
| 6,988,029 | B1 | 1/2006 | Kennedy |
| 6,990,951 | B1 | 1/2006 | Liu |
| 6,993,428 | B1 | 1/2006 | Gundrum |
| 7,000,393 | B1 | 2/2006 | Wood |
| 7,013,212 | B1 | 3/2006 | de Ojeda |
| 7,047,953 | B2 | 5/2006 | Kennedy |
| 7,058,502 | B2 | 6/2006 | Rodgers |
| 7,130,736 | B2 | 10/2006 | Bishop |
| 7,184,877 | B1 | 2/2007 | de Ojeda |
| 7,200,485 | B2 | 4/2007 | Kennedy |
| 7,277,791 | B2 | 10/2007 | Petrosius |
| 7,418,336 | B2 * | 8/2008 | Matekunas et al. ........... 701/103 |
| 7,761,223 | B2 * | 7/2010 | Wang et al. ................... 701/114 |
| 7,925,422 | B2 * | 4/2011 | Hiramatsu .................... 701/113 |
| 2004/0069281 | A1 | 4/2004 | Corba |
| 2004/0181325 | A1 | 9/2004 | Rodriguez |
| 2005/0075779 | A1 | 4/2005 | Read |
| 2005/0114002 | A1 | 5/2005 | Rodgers |
| 2005/0177301 | A1 | 8/2005 | Bishop |
| 2005/0177302 | A1 | 8/2005 | Rodriguez |
| 2005/0216174 | A1 | 9/2005 | Rodriguez |
| 2005/0288846 | A1 | 12/2005 | Liu |
| 2006/0005805 | A1 | 1/2006 | Liu |
| 2006/0064229 | A1 | 3/2006 | Kennedy |
| 2006/0185353 | A1 | 8/2006 | Liu |
| 2006/0200297 | A1 | 9/2006 | Liu |
| 2007/0084427 | A1 | 4/2007 | Petrosius |
| 2007/0129876 | A1 | 6/2007 | Zhang |
| 2007/0246004 | A1 * | 10/2007 | Matekunas et al. ........... 123/299 |
| 2009/0323250 | A1 * | 12/2009 | Thompson .................... 361/264 |

* cited by examiner

ENGINE GLOW PLUG DIAGNOSIS USING CRANKSHAFT SENSOR DATA

FIELD OF THE INVENTION

This invention relates to motor vehicles powered by combustion engines, especially diesel engines, that have cold start aids, such as glow plugs, for aiding engine starting in cold weather. More specifically the invention relates to a system for diagnosing glow plug operation with the intent of indicating an under- or non-performing glow plug.

BACKGROUND OF THE INVENTION

Diesel engines in certain motor vehicles often use a starting aid, particularly when engine starting is attempted in cold weather. The starting aid is employed until sufficient heat has been developed in the combustion chambers for assured combustion of injected diesel fuel by compression ignition.

Known cold start aids include ether injection, block heating, and glow plugs. Ether injection introduces into the combustion chambers a gas (ether) that is highly combustible and effective to aid fuel ignition even at low temperatures. The use of ether requires an on-board supply that eventually needs to be replenished, and installation of an ether system adds to the engine cost.

Glow plugs are electrically energized to heat the combustion chambers to aid combustion of injected diesel fuel. After an initial period of being energized before the engine is cranked, the glow plugs may continue to be energized for a limited time as the engine begins to run.

A glow plug starting aid system typically has one or more glow plugs associated with each combustion chamber, and some form of controller or control system that controls the delivery of electric current to the glow plugs from the vehicle battery or battery bank. The controller may comprise one or more relays or solid state devices through which battery current is conducted to the glow plugs.

When a cold engine is to be started, one or more relays operate one or more contacts that connect the glow plugs to the battery, with the electric current acting to heat the glow plugs which in turn heat the combustion chambers. During combustion chamber heating the relays may be intermittently cycled off by the controller so that the current is intermittently delivered to the glow plugs. The engine is thereafter cranked until it starts and begins running under its own power, and the relays may continue to be operated for a limited length of time as the engine warms up.

Failure of a cold start aid to start the engine may be due to various causes including ones other than in the cold start aid itself. In cold weather, a fault in the cold start aid may be sufficient by itself however to render the engine incapable of being successfully started. Cold weather also strains the battery or batteries that are used to crank the engine via the starter motor. A driver of a motor vehicle who is attempting to start a diesel engine in cold weather may continue cranking the engine in expectation of its eventual starting. But excessive cranking will drain the battery or batteries and render them incapable of further cranking. At that point, the vehicle requires service personnel and equipment to come to its aid, often resulting in the vehicle having to be towed to a service facility.

A known glow plug start aid comprises a glow plug module, or controller, that is installed in a motor vehicle in association with the engine. The start aid may be essentially entirely self-contained in the module except of course for the glow plugs themselves. Diagnostics can be included for indicating an under- or non-performing glow plug.

SUMMARY OF THE INVENTION

The present invention relates to a system and method that uses data from a crankshaft sensor, in conjunction with other data, for indicating an under- or non-performing glow plug.

The invention is capable of implementation in an existing processor associated with the engine, and therefore offers the potential for elimination of glow plug diagnostics from a separate glow plug control module. It could also potentially simplify the construction of such a module or even eliminate the need for such a module by packaging needed components in a different way or integrating them with other types of modules. The use of crankshaft data for indicating under- or non-performance of an engine start cold start aid can contribute to overall engine system synergy with potentially favorable cost-implications.

One generic aspect of the present invention relates to a motor vehicle comprising an internal combustion engine that has a cold start aid for aiding combustion of fuel in combustion chambers of the engine when the engine is cold and a switch is operated to crank and fuel the engine, and a processor for initiating operation of the cold start aid in advance of cranking and fueling the engine and for using data from a crankshaft rotation sensor associated with a crankshaft of the engine to indicate under- or non-performance of the cold start aid once the engine has been cranked, fueled, and commenced running under its own power.

Another generic aspect relates to a system for indicating under- or non-performance of a cold start aid associated with combustion chambers of a compression ignition internal combustion engine when the engine is cranked and fueled after having been exposed to ambient cold that affects proper combustion of fuel injected into the combustion chambers. The system comprises: a device for initiating operation of the cold start aid in advance of cranking and fueling the engine, and a processor programmed with an algorithm for processing data from a crankshaft rotation sensor associated with a crankshaft of the engine and for indicating, once the engine has commenced running under its own power, under- or non-performance of the cold start aid when the processed crankshaft rotation data discloses an aberration in engine speed indicative of under- or non-performance of the cold start aid.

Still another generic aspect relates to a method for indicating under- or non-performance of an engine cold start aid once the engine with which the cold start aid is associated has been cranked, fueled, and commenced running under its own power. The method comprises, with the engine having been soaked in cold ambient temperature that makes use of the cold start aid appropriate to aid combustion of fuel injected into the combustion chambers, operating the cold start aid and cranking and fueling the engine; and detecting aberrations in engine speed data indicating under- or non-performance of the cold start aid once the engine has been cranked, fueled, and commenced running under its own power.

The foregoing, along with further features and advantages of the invention, will be seen in the following disclosure of a presently preferred embodiment of the invention depicting the best mode contemplated at this time for carrying out the invention. This specification includes a drawing, now briefly described as follows.

DESCRIPTION OF THE PREFERRED EMBODIMENT

Figure 1:
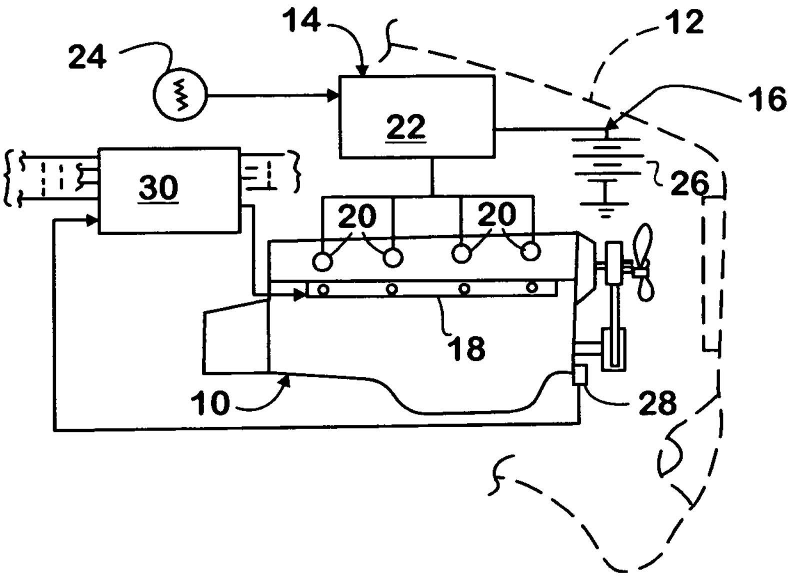
FIG. 1 is schematic diagram of portions of a motor vehicle engine, including a cold start air and associated electrical system, that can be considered as a reference for explaining principles of the present invention.

FIG. 1 shows a diesel engine 10 housed inside an engine compartment 12 of a motor vehicle and a cold start aid 14 that is associated with engine 10 and an electrical system 16 of the vehicle. An example of such a motor vehicle is a heavy truck where engine 10 comprises combustion chambers into which diesel fuel is injected by a fuel injection system 18 to ignite under heat of compression and thereby run the engine to propel the vehicle.

To aid engine starting in cold ambient conditions that affect proper combustion of fuel injected into the combustion chambers, cold start aid 14 comprises individual glow plugs 20 associated with the combustion chambers and a glow plug module, or controller, 22 that is associated with electrical system 16.

Electrical system 16 comprises an ignition switch 24 that is disposed in the cab of the vehicle for driver access and functions to turn engine 10 on and off. The typical ignition switch requires a key to selectively operate the switch to ACCESSORY, OFF, IGNITION, and CRANK positions. The IGNITION position may sometimes be referred to as ON position. The key is typically inserted into the switch when the switch is in OFF position. Turning the inserted key one way from OFF position places the switch in ACCESSORY position. Turning the inserted key the other way from OFF position places the switch first in IGNITION, or ON, position. Turning the key still farther against a return spring places the switch in CRANK position for cranking engine 10 at starting.

One control input to glow plug module 22 is a circuit that signals that ignition switch 24 has been placed in ON position. While actual operation of the glow plug system may also depend on other control inputs, the glow plugs cannot be energized from the vehicle battery or batteries 26 unless ignition switch 24 is in ON position.

A typical procedure for using cold start aid 14 comprises turning ignition switch 24 to ON position to cause battery or batteries 26 to deliver electric current through module 22 to glow plugs 20 to begin heating them. A lamp or other form of signaling device that is available to the driver of the vehicle lights, or signals, once the glow plugs have been heated sufficiently that they can be effective to aid combustion of fuel that is injected into the combustion chambers when the engine is subsequently cranked by turning ignition switch to the CRANK position. The glow plugs may continue to be energized for a limited time even after the engine has been cranked and commences running under its own power.

When cranking and fueling result in successful starting of engine 10, the engine crankshaft rotates as combustion of fuel in the combustion chambers operates pistons coupled to cranks of the crankshaft. A toothed wheel is coupled to the crankshaft, and a crankshaft rotation sensor 28 is disposed in a suitable location proximate that wheel to be acted on by teeth of the wheel moving past the sensor as the crankshaft revolves. Consequently sensor 28 develops an pulsating electrical output signal whose frequency corresponds to the rate at which teeth of the toothed wheel move past it and hence crankshaft rotational speed. The teeth may have one or more marker teeth correlated with rotational position of the crankshaft so that the sensor output signal can provide a marker identifying crankshaft rotary position. The sensor is therefore sometimes called a crankshaft position sensor. For purposes of the present invention, the importance of the sensor resides in the fact that it can provide essentially instantaneous engine speed information, either directly or by suitable processing in a processor.

Figure 2:
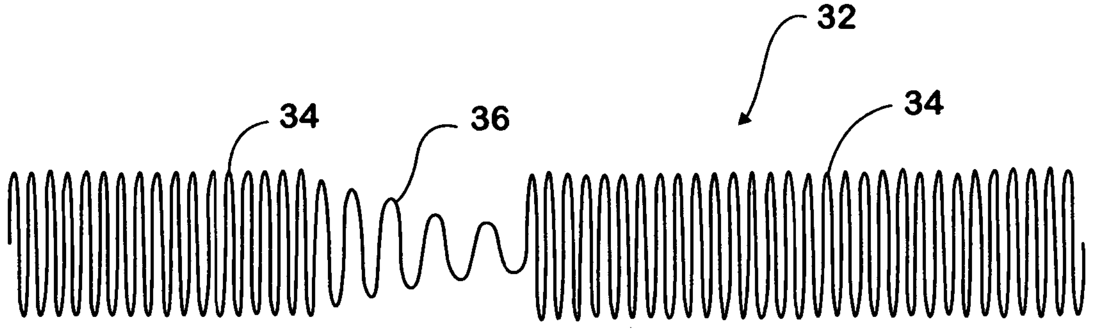
FIG. 2 is a snap-shot over a short interval of time of a representative signal in the electrical system that relates to an explanation of principles of the invention.

A portion of electrical system 16 comprises a processor 30 for processing various data to control various aspects of engine operation. The output signal of sensor 28 is an input to processor 30. Processing of that signal provides essentially instantaneous engine speed data. FIG. 2 shows a waveform trace 32 intended as a general depiction of a representative sensor output signal for the purpose of explaining principles of the invention. Trace 32 is a snap-shot over a short interval of time showing the effect of an under- or non-performing glow plug.

Trace 32 comprises a pulsating waveform whose pulses are caused by teeth of a toothed wheel on the engine crankshaft moving past and acting on sensor 28. Hence the instantaneous frequency of waveform 32 is representative of engine speed. Waveform 32 is shown to have two regions 34 where the engine speed is substantially constant. Between those regions is an aberrational region 36 where the frequency of the waveform diminishes. The amplitude may also diminish as shown.

The aberration is due to a momentary deceleration of the engine caused by under- or non-performance of one of the glow plugs 20 associated with one of the combustion chambers. In a multi-cylinder diesel engine for example, region 36 will appear once during every 720° of crankshaft rotation if there is one affected cylinder.

Processing of the waveform by processor 30 discloses the presence of region 36. For indicating with high probability that the source of the aberration is in fact an under- or non-performing glow plug, processor 30 comprises an algorithm that during execution processes certain data related to aspects of engine operation other than the glow plugs to exclude such other aspects as a cause of the aberration in engine speed that is otherwise indicative of under- or non-performance of a glow plug. Data related to fueling of the combustion chambers is an example of data that is used to exclude fueling of the combustion chambers as the cause of the aberration.

The glow plugs may be kept on for a limited amount of time after the engine has been started after having been soaked in cold ambient. Engine coolant temperature and the time for which the engine has been running under its own power can be also be processed for ruling out engine fueling as the cause of an aberration like aberration 36. A non- or under-performing glow plug tends to cause incomplete combustion, rather than no combustion at all. The likely failure mode for a fuel injector is no fuel being injected. There is existing software for detecting certain injector failures and there is software available to compensate for a degraded injector (cylinder balancing). Depending on the nature of the indicated under- or non-performance of a glow plug, the aberrational region 36 may disappear early as the engine warms and typically would disappear entirely once the engine is fully warm.

While a presently preferred embodiment of the invention has been illustrated and described, it should be appreciated that principles of the invention apply to all embodiments falling within the scope of the following claims.

What is claimed is:

1. A motor vehicle comprising:

an internal combustion engine that has one or more glow plugs for aiding combustion of fuel in combustion chambers of the engine when the engine is cold and a switch is operated to crank and fuel the engine;

a processor for initiating operation of the one or more glow plugs in advance of cranking and fueling the engine during a cold start and for using data from a crankshaft rotation sensor associated with a crankshaft of the engine to indicate under- or non-performance of the one or more glow plugs once the engine has been cranked, fueled, and commenced running under its own power after the cold start, wherein the processor comprises an algorithm that during execution processes data from the crankshaft rotation sensor disclosing aberrations in engine speed potentially indicative of under- or non-performance of the one or more glow plugs and data for excluding potential causes of the disclosed aberrations other than the one or more glow plugs, and that gives a signal indicating under- or non-performance of the one or more glow plugs upon the excluding other potential causes as causes of the disclosed aberrations.

2. A motor vehicle as set forth in claim 1 wherein during execution of the algorithm, the processor also processes certain data related to other aspects of engine operation to exclude such other aspects as a cause of aberrations in engine speed that are otherwise indicative of under- or non-performance of the one or more glow plugs.

3. A motor vehicle as set forth in claim 1 wherein during execution of the algorithm, the processor also processes certain data related to fueling of the combustion chambers to exclude fueling of the combustion chambers as a cause of aberrations in engine speed that are otherwise indicative of under- or non-performance of the one or more glow plugs.

4. A system for indicating under- or non-performance of one or more glow plugs associated with combustion chambers of a compression ignition internal combustion engine when the engine is cranked and fueled after having been exposed to ambient cold that affects proper combustion of fuel injected into the combustion chambers, the system comprising:

a device for initiating operation of the one or more glow plugs in advance of cranking and fueling the engine during a cold start and a processor programmed with an algorithm for processing data from a crankshaft rotation sensor associated with a crankshaft of the engine and for indicating, once the engine has commenced running under its own power after the cold start, under- or non-performance of the one or more glow plugs when the processed crankshaft rotation data discloses an aberration in engine speed potentially indicative of under- or non-performance of the one or more glow plugs, wherein when the processor, during execution of the algorithm, processes data from the crankshaft rotation sensor disclosing aberrations in engine speed potentially indicative of under- or non-performance of the one or more glow plugs also processes certain data related to fueling of the combustion chambers to exclude aberration in fueling of the combustion chambers as a cause of aberrations that are otherwise indicative of under- or non-performance of the one or more glow plugs.

5. A system as set forth in claim 4 wherein when the processor, during execution of the algorithm, processes data from the crankshaft rotation sensor disclosing aberrations in engine speed indicative of under- or non-performance of the one or more glow plugs also processes certain data related to other aspects of engine operation to exclude such other aspects as causes of aberrations that are otherwise indicative of under- or non-performance of the one or more glow plugs.

6. A method for indicating under- or non-performance of one or more glow plugs once the engine with which the cold start aid is associated has been cranked, fueled, and commenced running under its own power, the method comprising:

with the engine having been soaked in cold ambient temperature that makes use of the one or more glow plugs appropriate to aid combustion of fuel injected into the combustion chambers, operating the one or more glow plugs and cranking and fueling the engine;

detecting aberrations in engine speed data potentially indicating under- or non-performance of the one or more glow plugs once the engine has been cranked, fueled, and commenced running under its own power after the cold start; and processing certain data related to other aspects of engine operation to exclude such other aspects as causes of aberrations in engine speed data that are otherwise indicative of under- or non-performance of the one or more glow plugs.

7. A method as set forth in claim 6 wherein the step of detecting aberrations in engine speed data comprises processing data from a crankshaft rotation sensor associated with a crankshaft of the engine.

8. A method as set forth in claim 7 further including processing certain data related to fueling of the combustion chambers to exclude fueling of the combustion chambers as causes of aberrations in engine speed data that are otherwise indicative of under- or non-performance of the one or more glow plugs.

* * * * *